United States Patent
Zhang et al.

(10) Patent No.: US 11,537,653 B2
(45) Date of Patent: Dec. 27, 2022

(54) AUTOMATED PERSONALIZED IDENTIFIER SWITCHING IN VIEW OF CLOSENESS

(71) Applicant: INTERNATIONAL BUSINESS MACHINES CORPORATION, Armonk, NY (US)

(72) Inventors: Juan Zhang, Beijing (CN); Si Bin Fan, Beijing (CN); Jie Mao, Beijing (CN); Jonathan Dunne, Dungarvan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 221 days.

(21) Appl. No.: 16/249,476

(22) Filed: Jan. 16, 2019

(65) Prior Publication Data
US 2020/0226172 A1  Jul. 16, 2020

(51) Int. Cl.
*G06F 16/538* (2019.01)
*G06Q 10/10* (2012.01)

(52) U.S. Cl.
CPC ......... *G06F 16/538* (2019.01); *G06Q 10/109* (2013.01)

(58) Field of Classification Search
CPC .............................. G06F 16/538; G06Q 10/109
See application file for complete search history.

(56) References Cited

U.S. PATENT DOCUMENTS 8,332,413 B1 * 12/2012 Li ........................... G06Q 10/10
707/748
8,499,049 B2  7/2013 Lee et al.
9,166,961 B1 * 10/2015 Johansson ............... H04L 63/08
9,489,566 B2  11/2016 Yano et al.
(Continued)

FOREIGN PATENT DOCUMENTS

CN  102460502 A  5/2012
CN  105025173 A  11/2015
(Continued)

OTHER PUBLICATIONS

Rehman, "SwitchMe: Create & Switch Between Multiple Android User Pro", Jan. 27, 2012, 36 pages.
(Continued)

*Primary Examiner* — Pierre M Vital
*Assistant Examiner* — Zuheir A Mheir
(74) *Attorney, Agent, or Firm* — Maeve Carpenter; Andrew D. Wright; Calderon Safran & Cole P.C.

(57) ABSTRACT

Automated personalized identifier switching is provided for switching personalized identifiers for individuals and groups. For this purpose, a system includes: a computer readable memory, and a computer readable storage medium located in a computer; program instructions to store a plurality of identifiers of a user in a database, wherein each of the identifiers has a different closeness factor of the user than other identifiers of a same type stored in the database; program instructions to determine a closeness factor of a contact to a user; program instructions to match the determined closeness factor of the contact with an identifier having the same closeness factor stored in an database; and program instructions to transmit the matched identifier from the database to the contact for display as an identifier of the user.

20 Claims, 7 Drawing Sheets

(56) References Cited

U.S. PATENT DOCUMENTS

| | | | |
|---|---|---|---|
| 11,108,716 B1* | 8/2021 | Friedland | H04L 51/52 |
| 2002/0132610 A1 | 9/2002 | Chaplin et al. | |
| 2005/0044423 A1* | 2/2005 | Mellmer | G06F 21/41 |
| | | | 726/4 |
| 2008/0021870 A1* | 1/2008 | Birnbaum | G06Q 10/10 |
| 2009/0070665 A1* | 3/2009 | Chijiiwa | H04L 63/102 |
| | | | 715/235 |
| 2009/0125521 A1* | 5/2009 | Petty | G06F 21/604 |
| 2010/0274815 A1* | 10/2010 | Vanasco | G06Q 10/107 |
| | | | 707/798 |
| 2010/0319052 A1* | 12/2010 | Ferren | H04L 67/306 |
| | | | 726/3 |
| 2011/0179125 A1 | 7/2011 | Lee et al. | |
| 2011/0314017 A1* | 12/2011 | Yariv | H04L 51/02 |
| | | | 707/737 |
| 2013/0129142 A1* | 5/2013 | Miranda-Steiner | |
| | | | G06K 9/00664 |
| | | | 382/103 |
| 2013/0148864 A1* | 6/2013 | Dolson | G06F 16/58 |
| | | | 382/115 |
| 2014/0012925 A1* | 1/2014 | Narayanan | G06Q 50/01 |
| | | | 709/206 |
| 2015/0039989 A1* | 2/2015 | Dhanawat | G06F 40/174 |
| | | | 715/226 |
| 2016/0100050 A1 | 4/2016 | VanBlon | |
| 2016/0134692 A1* | 5/2016 | Ju | H04W 4/08 |
| | | | 709/204 |
| 2016/0335350 A1 | 11/2016 | Bawri | |
| 2016/0378776 A1* | 12/2016 | Green | G06F 16/9537 |
| | | | 707/737 |
| 2017/0032470 A1* | 2/2017 | Watanachote | G06Q 50/01 |
| 2017/0372282 A1* | 12/2017 | Sarin | G06Q 20/20 |
| 2018/0083976 A1* | 3/2018 | Egan | H04L 63/104 |
| 2018/0198831 A1* | 7/2018 | Calcaterra | H04L 41/0893 |
| 2019/0018848 A1 | 1/2019 | Lee | |

FOREIGN PATENT DOCUMENTS

| | | |
|---|---|---|
| CN | 105141507 A | 12/2015 |
| WO | 2017032215 A1 | 3/2017 |

OTHER PUBLICATIONS

Nachman, "Automatic Profile Switching", ITerm2, Accessed Nov. 7, 2018, 4 pages.

Mell et al., "The NIST Definition of Cloud Computing", NIST, Special Publication 800-145, Sep. 2011, 7 pages.

List of IBM Patents or Patent Applications Treated as Related', dated Jul. 19, 2019, 1 page.

Specification "Automated Personalized Identifier Switching" and Drawings in U.S. Appl. No. 16/508,911, filed Jul. 11, 2019, 36 pages.

Office Action dated Oct. 23, 2020, in related U.S. Appl. No. 16/508,911, 26 pages.

Office Action dated Apr. 30, 2021 in related U.S. Appl. No. 16/508,911, 48 pages.

Office Action dated Dec. 3, 2021 in related U.S. Appl. No. 16/508,911, 47 pages.

Office Action dated Jun. 20, 2022 in related U.S. Appl. No. 16/508,911, 68 pages.

* cited by examiner

AUTOMATED PERSONALIZED IDENTIFIER SWITCHING IN VIEW OF CLOSENESS

BACKGROUND

The present invention generally relates to automated switching of personalized identifiers for individuals and groups, and, more particularly, to automated switching of personalized identifiers by determining a closeness factor of a contact to a user and matching the determined closeness factor of the contact with an identifier having the same closeness factor stored in a database which serves as an identifier library.

In personal and social networks, it is common for a user to have multiple contacts and to be associated with multiple different groups. Generally, the purposes of each contact and each group are different from one another. For example, family groups are private and informal, whereas working groups are formal and professional. Other groups, such as various clubs, sports organizations etc. are generally informal, but not necessarily private. Individual users within different groups often have different roles within the groups. If a user's identifier is public and unique, all of the contacts and all of the members in a given group can view the same identifier for each individual user. Also, different identifiers are often appropriate for the different groups, for example, based on whether the group is private, public, formal or informal.

SUMMARY

In an aspect of the invention, there is a system comprising: a processor, a computer readable memory, and a computer readable storage medium located in a personal assistant device; program instructions to store a plurality of identifiers of a user in a database, wherein each of the identifiers has a different closeness factor of the user than other identifiers of a same type stored in the database; program instructions to determine a closeness factor of a contact to a user; program instructions to match the determined closeness factor of the contact with an identifier having the same closeness factor stored in the database; and program instructions to transmit the matched identifier from the database to the contact to display as an identifier of the user, wherein the program instructions are stored on the computer readable storage medium for execution by the processor via the computer readable memory.

In another aspect of the invention, there is computer program product, comprising a computer readable storage medium having program instructions embodied therewith, the program instructions executable by a computer device to cause the computer device to: determine a closeness factor of a contact to a user; match the determined closeness factor of the contact with an identifier having the same closeness factor stored in a database comprised of a plurality of different types of identifiers of the user; and transmit the matched identifier from the database to the contact to display as an identifier of the user, wherein at least two of the plurality of identifiers in the database have different closeness factors from one another.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
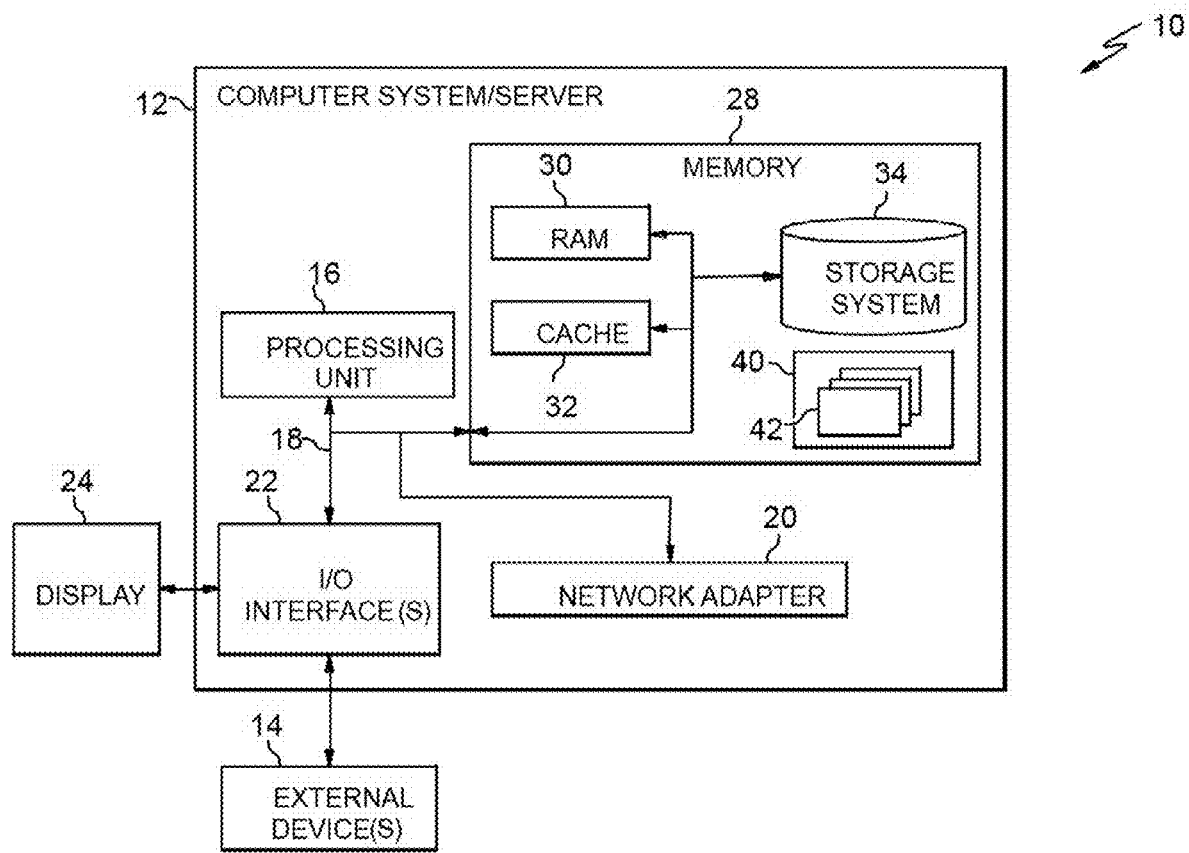
FIG. 1 depicts a cloud computing node according to an embodiment of the present invention.

The present invention generally relates to automated switching of personalized identifiers for individuals and groups, and, more particularly, to automated switching of personalized identifiers by determining a closeness factor of a contact to a user and matching the determined closeness factor of the contact with an identifier having the same closeness factor stored in a database serving as an identifier library.

Typically, in social networks, it is common for users to have multiple contacts and belong to different groups, each comprised of a number of contacts. Because the purposes and the closeness of the personal relationships of a user are different with regard to different contacts and different groups, it is generally not appropriate to use the same identifiers for the user with all of their contacts and in all of their groups. For example, in a social chat application, e.g., web chat, a user's personalized identifier, which might include pictures of the user's family, is appropriate when the user is communicating with family members, relatives and close friends. On the other hand, that same identifier would not be appropriate for communicating with business contacts. In the latter situation, a more formal picture, as well as a company logo, would be appropriate identifiers. Similarly, photos with appropriate clothing are often used with regard to a user's different activities, for example, a photo of the user in a sports uniform with regard to a sports club that the user is a member of.

Currently, it is not possible to switch different identifiers intelligently for a user so that an appropriate identifier is displayed suitably across different contacts and different groups. Controlling access to rights to a user's profile allows some degree of control, but does not provide for automatically displaying different identifiers for different contacts or different groups.

Aspects of the present invention include automatically switching a user's personalized identifiers intelligently based upon a determination of the closeness of the personal relationship between the user and the contact, so that an appropriate identifier can be displayed suitably across different groups and among different contacts.

In embodiments, an identifier library, comprised of a database, stores personalized identifiers for the user which can include photos, logos, signatures, various locations, such as home or office address, and the user's nationality. For each identifier provided in the identifier library, an indication of the closeness of the relationship is provided, hereinafter referred to as a closeness factor.

In embodiments, an identifier selection module determines closeness factors for each of the user's individual contacts. In addition, the identifier selection module determines closeness factors for the different groups which the user is a member of, based on the closeness factors of the individuals making up the group, as well as other factors such as the current group topic, the group name or chat content. In embodiments, when a change occurs in either the contact's category or a privacy setting for the contact, the identifier selection module re-determines the individual closeness factors for the contacts. When there is a change in a group or the topic of the group, the identifier selection module re-determines the group closeness factor.

Advantageously, embodiments of the present invention provide technical solutions to the problem of managing a database, comprised of an identifier library, to automatically provide appropriate selection of identifiers, such as photographs, to be displayed to a contact which the user is communicating with via a computer device, over a communication network. In implementations, the system performs an unconventional operation of determining, by a computer device, a closeness factor of a contact to the user, matching, by the computer, the determined closeness factor of the contact with an identifier having the same closeness factor stored in the identifier library, which is comprised of a database, and displaying the matched identifier to the contact on a physical display device. Aspects of the invention are implemented using devices and techniques that are necessarily rooted in computer technology, such as managing the inputs and outputs of a computer database, that have no pre-computer analog. Further, aspects of the invention are implemented with particular physical devices, such as display devices, and by using wireless communication between computer devices of a user and the user's contacts.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
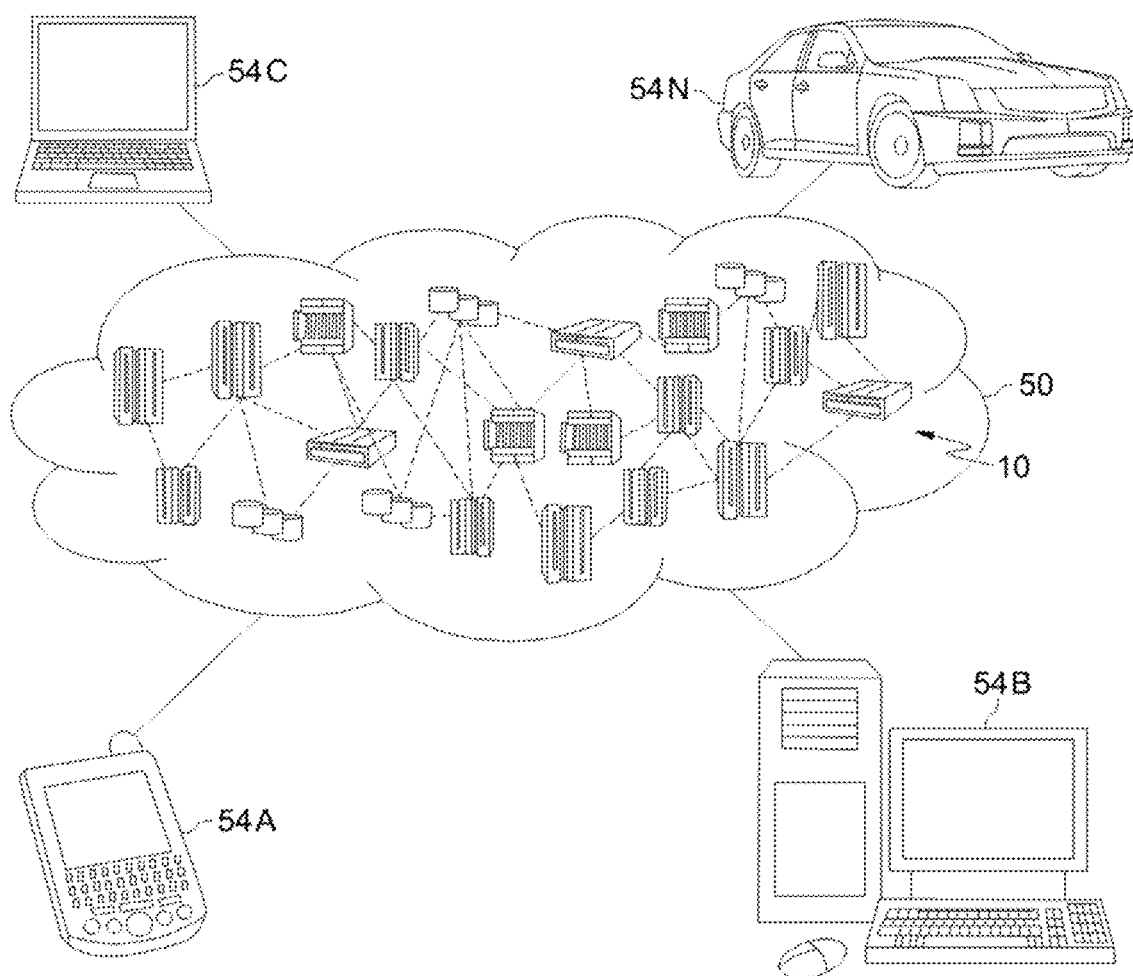
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
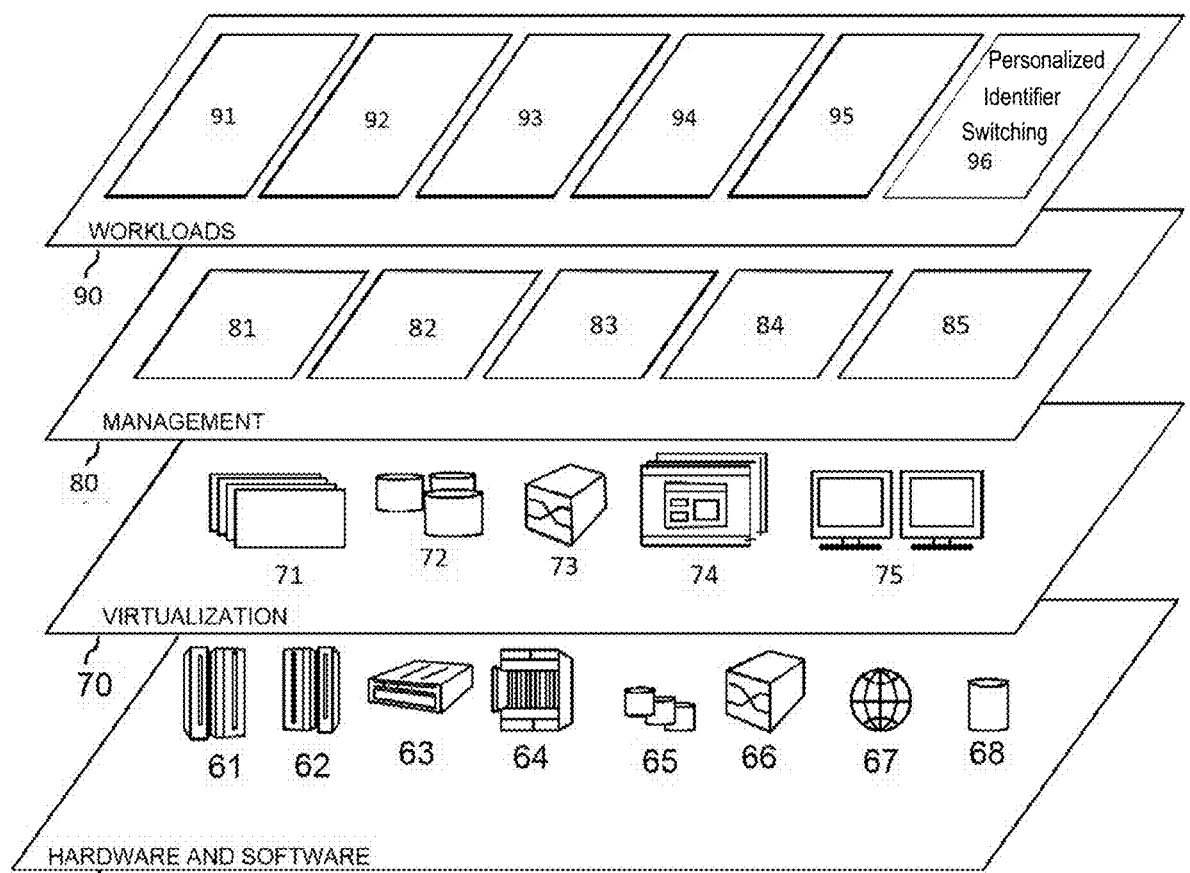
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized identifier switching 96.

Figure 4:
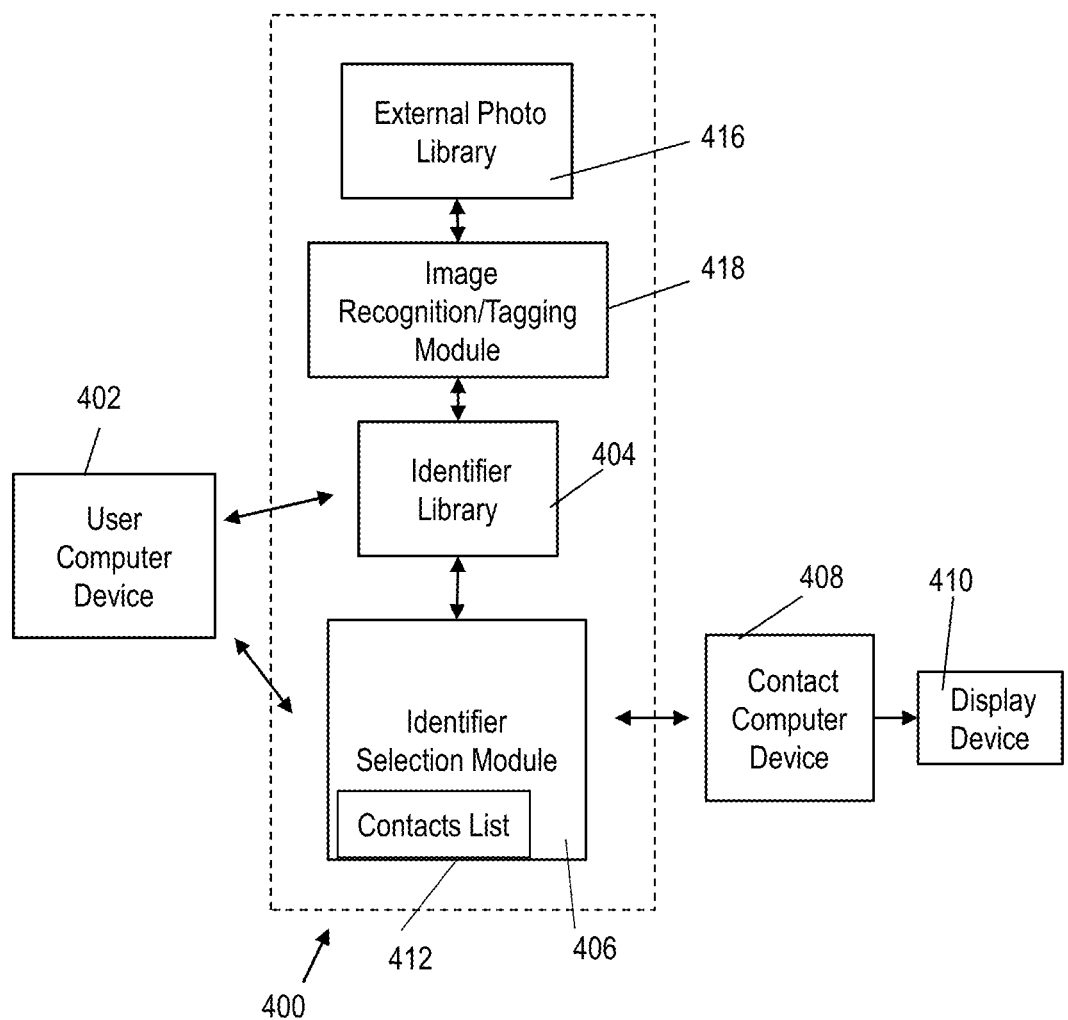
FIG. 4 shows a block diagram of an exemplary embodiment in accordance with aspects of the invention.

FIG. 4 shows a block diagram of an exemplary embodiment in accordance with aspects of the invention. In this embodiment the personalized identifier switching 96 shown in FIG. 3 are implemented by an automated personalized identifier switching system 400 which is provided for a user computer device 402. In embodiments, the automated personalized identifier switching system 400 includes an identifier library 404, comprised of a database operating as a profile personalized identifier library, and an identifier selection module 406 structured to determine or calculate closeness factors for contacts of the user, in communication with the user through, for example, a remote contact computer device 408. A display device 410 is provided for the contact computer device 408. Although this display device 410 is shown in FIG. 4 as being separate from the contact computer device 408, it could, of course, be incorporated into the contact computer device 408.

In embodiments, the identifier selection module 406 includes a contacts list 412 comprised of individual contacts and group contacts provided to the identifier selection module 406 by the user computer device 402. In alternative embodiments, the contacts list 412 is located in the user computer device 402, and is accessible by the identifier selection module 406. In alternative embodiments, the contacts list 412 is in the user computer device 402, and is accessible to the identifier selection module 406. In embodiments, the user supplies data regarding identifiers and closeness factors directly to the identifier library 404. In alternative embodiments, an image recognition and tagging module 418 provides photos from an external photo library 416 and adds tagged information, including closeness factors.

In embodiments, the automated personalized identifier switching system 400, as well as the user computer device 402 and the contact computer device 408, are computer devices having one or more components of the computer system/server 12 shown in FIG. 1. In particular, the automated personalized identifier switching system 400 includes one or more program modules 42 shown in FIG. 1 to implement the operations described below. In addition, according to aspects of the present invention, the automated personalized identifier switching system 400 is designed to operate in a cloud computing environment, such as shown in FIG. 2, to connect to remote servers via a cloud computing environment 50.

In embodiments, the user computer device 402 inputs initial data, e.g., personalized identifiers of the user, such as photos, logos, signatures, locations and nationality, into the identifier library 404. The user computer device 402 also inputs data, hereinafter referred to as closeness factors, regarding the closeness of the relationship for which particular identifiers are used. In embodiments, the user classifies the closeness factors into levels of closeness, i.e., strong, medium strong, medium and weak, noting, of course, that alternative embodiments use a different number of levels for the closeness factors. In embodiments using the four levels of closeness, strong identifies family and other similar close affinity relationships, medium-strong identifies friends, classmates and similar close relationships, medium identifies colleagues, customers, and similar business relationships, and weak identifies strangers to the user.

As an example of the coordinated operation between the identifier selection module 406 and the identifier library 404, if the user decides that a particular photo being entered into the identifier library 404 is appropriate for a family member, the user tags that photo via the user computer device 402 with a closeness factor of "strong." The identifier selection module 406 tags any contact which is a stranger to the user, as determined from the absence of the contact from the user's contacts list 412, as "weak."

In an alternative embodiment, the image recognition and tagging module 418 enters the external photo library 416 and adds tags regarding the closeness factors into the identifier library 404. As such, the identifier library 404 operates as an interface with the external photo library 416 via the image recognition and tagging module 418. Specifically, leveraging image recognition technology, the image recognition and tagging module 418 classifies photos stored in the external photo library 416 according to face images, topics, etc., and then assigns tags to the classified photos. In embodiments, the tags are name-related and subject-related, for example, group photos, scenery, physical articles, etc. The identifier library 404 stores the photos and the tags, with a corresponding closeness factor being associated with each of the tags.

In embodiments, the identifier selection module 406 uses a strong closeness factor to match the stored photo with contacts, such as family members, which the identifier selection module 406 tags as having a strong closeness factor. In embodiments, the user enters other identifiers, such as a more formal photograph, into the identifier library 404 which the user determines to be appropriate for business contacts. In embodiments, the user tags this more formal photograph with a closeness factor of "medium." The identifier selection module 406 then matches business contacts, communicating with the automated personalized identifier switching system 400 via the contact computer device 408, with a closeness factor of medium, and selects the more formal photograph with the designated closeness factor of medium to transmit to the contact computer device 408 to display on the display device 410. In embodiments, the identifier selection module 404 performs the matching operation automatically, without the need for intervention by the user in performing the matching operation, which represents a significant advantage of the present invention.

In accordance with aspects of the invention, the identifier selection module 406 determines individual closeness factors for individual contacts on the contacts list 412 regarding the contact's category and by privacy settings established by the user via the user computer device 402. For example, in embodiments, the contact categories can include immediate family, other relatives, neighbors, friends, business associates, coworkers, and members of clubs which the user belongs to. In embodiments, the user establishes these contact categories, as well as contact privacy settings, and enters these into contacts list 412 in the identifier selection module 406 to allow the identifier selection module 406 to determine appropriate closeness factors when it communicates with individual contacts via contact computer devices 408. The user sets the privacy settings into the identifier selection module 406 for individual contacts on the contacts list 412 to allow some contacts to see certain identifiers of the user, while prohibiting other contacts from being able to view these identifiers.

In embodiments, the identifier selection module 406 also determines group closeness factors for groups (e.g., chat groups) which the user belongs to. To this end, the identifier selection module 406 first examines the closeness factors of each of the user's individual contacts that are in the group as one element of the group closeness factor. Next, the identifier selection module 406 factors in elements such as the current group topic, the group name and chat content, and combines this with the closeness factors of each of the user's individual contacts in the group, to arrive at a group closeness factor, which is stored in the contacts list 412. This group closeness factor is then used, in the manner described above for individual contact factors, to select an appropriate identifier based on the level of the group closeness factor, i.e., strong, medium strong, medium or weak. In alternative embodiments, the user provides information, including closeness factors, directly to the contacts list 412 for setting the group closeness factor to be used by the identifier selection module 406.

In embodiments, the present invention provides for dynamic adjustments for both individual contact closeness factors and group closeness factors based on changes with regard to the individual contacts and groups. For example, in embodiments, the identifier selection module 406 changes the individual contact closeness factor when it receives an indication from the user computer device 402 that the user has changed the contact category or contact privacy setting of an individual contact. Similarly, the identifier selection module 406 changes the group closeness factor when a change is made to the group itself or topics being considered by the group. For example, in embodiments, a user designates a group comprised initially of a small number of users with a strong group closeness factor. However, in time, the size of the group increases, and, in this embodiment, the identifier selection module 406 changes the group closeness factor to a medium group closeness factor in response to a request to do so by the user via the user computer device 402.

In the embodiments discussed above, the individual contacts stored in the identifier library 404 designate a one-to-one relationship between the user and the individual contacts. As noted above, the individual contacts are provided on a contacts list which is stored, for example, in the user computer device 402 or in a portion of the identifier library 404 or the identifier selection module 406. The group closeness factor, on the other hand, designates a one-to-many relationship between the user and the group which, as noted above, is based on a combination of the closeness factors of the individual contacts making up the group and other factors, such as the topic of the group, the group name and chat content.

In embodiments, the automated personalized identifier switching system 400 is connected to the user computer device 402 and contact computer devices 408 remotely, for example, by cloud computing techniques, has shown, for example, in FIGS. 2 and 3. In alternative embodiments, the automated personalized identifier switching system 400 is directly connected to one or both the user computer device 402 and/or the contact computer device 408 via a local connection, such as a Wi-Fi or LAN connection. In alternative environments, the automated personalized identifier switching system 400 is provided in the user computer device 402 itself.

Figure 5:
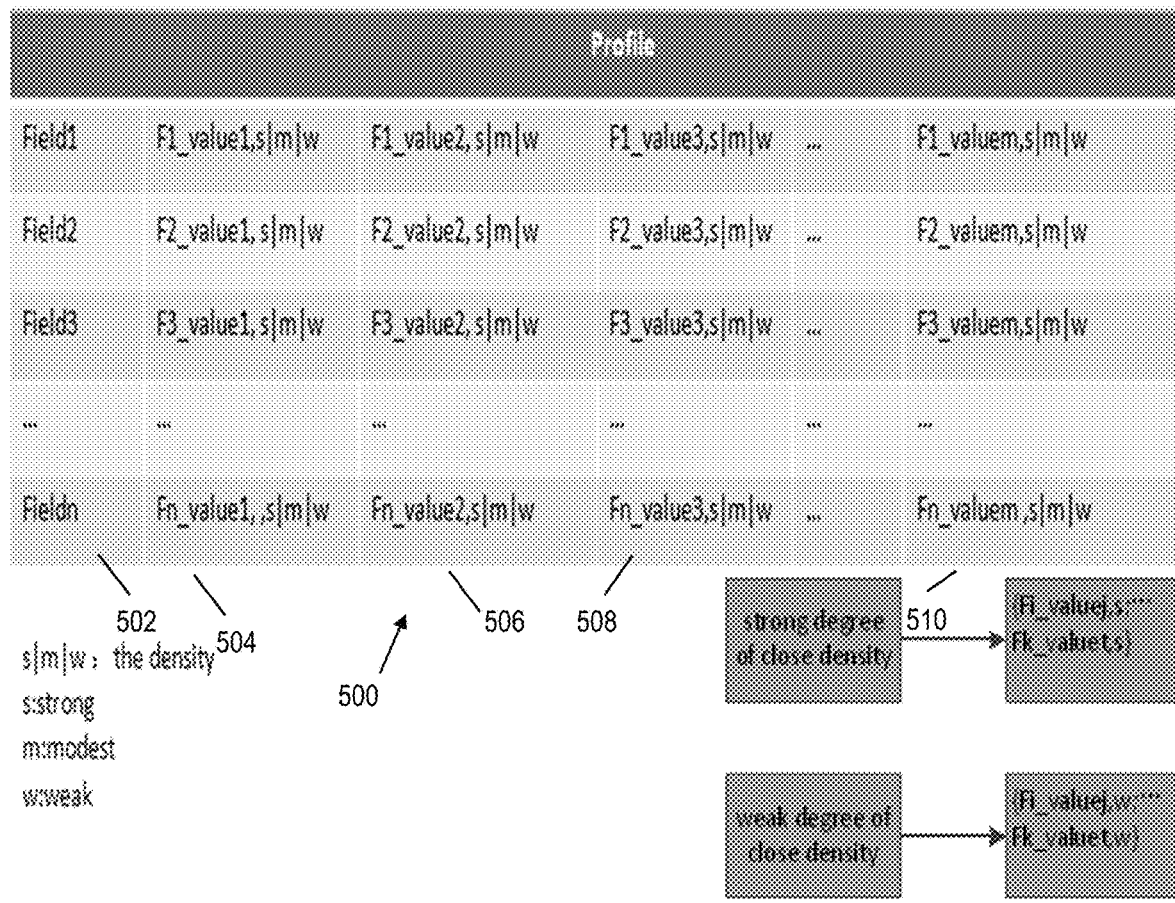
FIG. 5 shows a table in a portion of a database serving as an identifier library of an exemplary embodiment in accordance with aspects of the invention

FIG. 5 shows an example of a profile 500 established by a user via the user computer device 402 and stored in the identifier library 404. In embodiments, the fields (e.g., Field 1, Field 2, etc.) relate to the type of identifier being stored. For example, in embodiments, Field 1 stores nicknames, Field 2 stores photos or logos, Field 3 stores signatures, or locations or nationalities, etc. The columns 504, 506, 508 and 510 shown to the right of the fields column 502 store the actual identifiers, together with the closeness factor. As an example, in embodiments, the user computer device 402 stores a first nickname in the location F1_value1,s/m/w in the first column 504, together with a closeness factor "strong" to allow the particular nickname to be used as the user identifier with contacts which the user has a close personal relationship with. In this embodiment, there are three levels of closeness, namely, strong, modest (which can also be referred to as medium), and weak.

In the embodiments discussed above, the user directly controls the level of the group closeness factor stored in the identifier library 404 and with regard to the individual contacts and group contacts tagged by the identifier selection module 406. However, in alternative embodiments, the identifier selection module 406 determines either or both of closeness factors for the individual contacts or groups based on preset criteria. For example, in embodiments, the identifier selection module 406 assigns closeness factors for family members based on the degree of closeness of the family member to the user, e.g., immediate family, aunts and uncles, first cousins, second cousins, etc. Similarly, in alternative embodiments, the user computer device 402 or the identifier library 404 automatically assigns the closeness factors provided for the identifiers stored in the identifier library 404 based on the preset criteria, such as discussed above.

Figure 6:
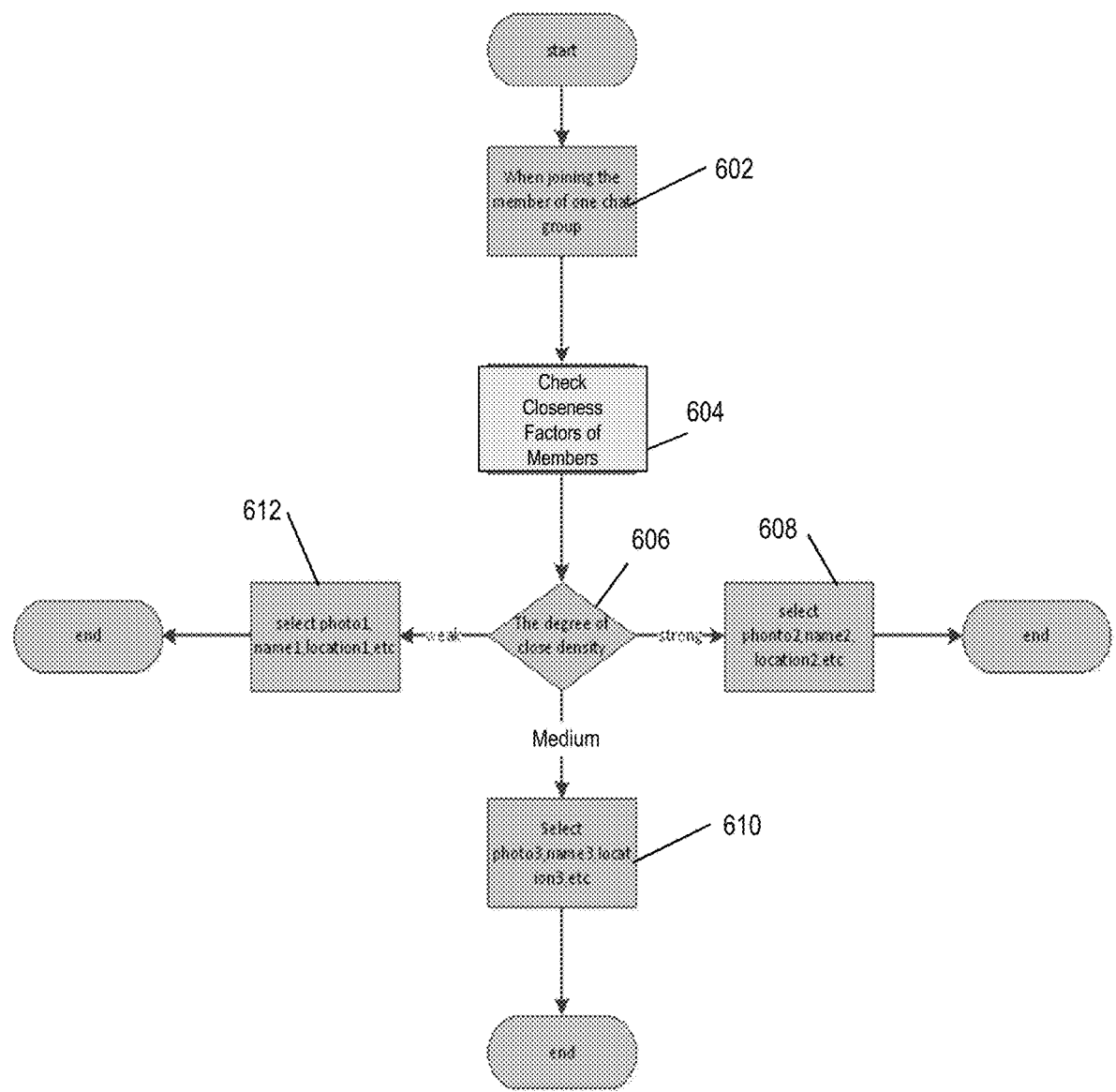
FIG. 6 shows a flowchart of operation of the identifier selection module in accordance with aspects of the invention.

FIG. 6 depicts a flowchart of an exemplary method of operation of the identifier selection module 406 in accordance with aspects of the invention. The steps of the method are performed in the environment of FIG. 4 and are described with reference to the elements and steps described with respect to FIGS. 2 and 3.

At step 602, the user computer device 402 joins a chat group as a member of the chat group. At step 604, the identifier selection module 406 checks the closeness factor (which can also be referred to as "close density") of each member of the chat group using the contact list provided by the user computer device 402, and the closeness factors for each member of the chat group provided by the user computer device 402. At step 606, the identifier selection module 406 routes the determination process along one of three different paths depending upon the determined closeness factor for each of the members of the chat group.

Thus, at step 608, the identifier selection module 406 selects particular identifiers for a photo, a name and a signature and/or location, stored in the identifier library 404, which is comprised of a database, to be transmitted to the contact computer devices 408 of the members of the chat group having a strong closeness factor for display on their respective display devices 410. Similarly, at step 610, the identifier selection module 406 selects a different photo, name and signature and/or location for contacts in the chat group determined to have a modest closeness factor. At step 612, the identifier selection module 406 selects a different photo, name and signature and/or location for members of the chat group which are determined to be strangers (i.e., not on the contact list provided to the identifier selection module 406), specifically, a photo, name and signature and/or location appropriate for a stranger with a weak closeness factor.

Figure 7:
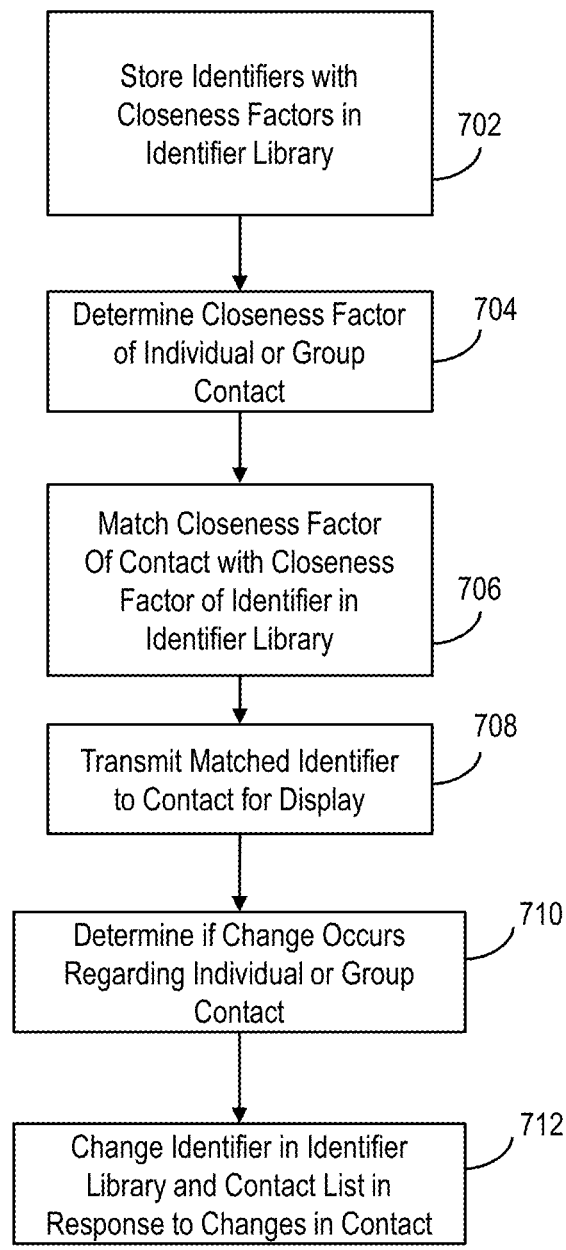
FIG. 7 shows a flowchart of operation of the exemplary embodiment in accordance with aspects of the invention.

FIG. 7 depicts a flowchart of an exemplary method of operation in accordance with aspects of the invention. The steps of the method are performed in the environment of FIG. 4 and are described with reference to the elements and steps described with respect to FIGS. 2 and 3.

At step 702, the user computer device 402 stores identifiers with closeness factors in the identifier library 404, as described above with regard to FIG. 4. At step 704, the identifier selection module 406 determines closeness factors of individual and/or group contacts, as discussed above with regard to FIG. 4. At step 706, the identifier selection module 406 matches the closeness factors of the individual and/or group contacts with closeness factors of the identifiers stored in the identifier library 404, comprised of a database, as discussed above with regard to FIG. 4. In embodiments, the identifier selection module 406 automatically matches the closeness factors, without the need for participation by the user in the selection of the appropriate identifier during the matching process. At step 708, the system transmits the matched identifier to the contact for display on the display of the contact computer device. In embodiments, and as described with respect to FIG. 4, step 708 comprises the identifier selection module 406 transmitting a matched identifier to the contact computer device 408, which then displays the matched identifier at the display device 410. In step 710, the user determines if changes have occurred in individual contacts or group contacts. For example, the user determines whether a contact category or a contact privacy setting for an individual contact has changed, or whether a group or the topics considered by the group has changed. In step 712, the user computer device 402 makes changes regarding the levels of the closeness factors for stored identifiers in the identifier library 404 based on changes with regard to the individual contacts or group contacts, as discussed above with FIG. 4. The user computer device 402 also makes changes, at step 712, regarding the closeness factors stored in the contacts list 412.

In embodiments, the term "identifier" used throughout pertains to a representation or embodiment of a person. As such, profile photographs are excellent identifiers since they generally provide immediate recognition of the person being identified. It is noted, however, that although the above description describes identifiers as including photos, as well as logos, signatures, locations and/or nationalities, the identifiers could include other types of identifiers used to represent individual and/or group users, such as favorite music, colors, nicknames, favorite sayings, etc.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for automatically switching an identifier of a user for display as the identifier of the user on a computing device of a contact, comprising:

a processor, a computer readable memory, and a computer readable storage medium located in a computer;

program instructions associating a plurality of identifiers of the user in a database, wherein each of the identifiers has a different closeness factor of the user;

program instructions to store the plurality of identifiers of the user in the database, wherein each of the identifiers has the different closeness factor of the user than other identifiers of a same type stored in the database, wherein the plurality of identifiers include photos;

program instructions to receive the photos from an external photo library by an image recognition and tagging device;

program instructions to classify the photos according to topics using the image recognition and tagging device;

program instructions to automatically select the identifier of the user without need for intervention by the user for display as the identifier of the user on the computing device of the contact in communication with the user over the network comprising:

program instructions to automatically determine a closeness factor of the contact to the user, the determined closeness factor of the contact having the same closeness factor with an identifier stored in the database comprised of the plurality of different types of identifiers of the user, the closeness factor indicative of a level of personal closeness of a relationship between the user and the contact, the level including a strong level of closeness, a medium strong level of closeness, a medium level of closeness, and a weak level of closeness; and program instructions to automatically match the determined closeness factor of the contact with the identifier having the same closeness factor stored in the database;

program instructions to automatically transmit the matched identifier from the database to the computing device of the contact in communication over the network for display as the identifier of the user on the computing device, wherein the contact is one of a plurality of contacts forming a chat group which the user belongs to;

program instructions to automatically switch the identifier of the user in communication over the network with the chat group comprising:

program instructions to automatically determine a group closeness factor for the chat group based on a combination of closeness factors of each contact making up the chat group and other factors including a topic of the group, a group name, and a chat content of the chat group;

program instructions to automatically check the closeness factors of each contact of the chat group using a user's contact list and the closeness factors of each contact of the chat group; and program instructions to automatically match the determined group closeness factor of the chat group with a different identifier having the same closeness factor stored in the database; and program instructions to automatically transmit the different identifier from the database to each computing device of each contact of the chat group in communication over the network for display as the different identifier of the user on the computing device of each contact of the chat group, wherein the program instructions are stored on the computer readable storage medium for execution by the processor via the computer readable memory.

2. The system of claim 1, wherein:
types of identifiers stored in the database further include logos and signatures; and
the photos are tagged with information, including the closeness factors, by the image recognition and tagging device.

3. The system of claim 1, wherein each of the identifiers in the database has a corresponding closeness factor.

4. The system of claim 1, wherein the closeness factor is based on at least one selected from a group consisting of: a category which the contact belongs to; and a contact privacy setting assigned by the user to the contact.

5. The system of claim 4, wherein different closeness factors are assigned to family members and personal friends than to business contacts.

6. The system of claim 4, further comprising program instructions to re-determine the closeness factor of the contact when the contact category or privacy setting is changed.

7. The system of claim 1, wherein the contact is on the user's contact list.

8. The system of claim 7, further comprising program instructions to determine an absent contact from the user's contact list.

9. The system of claim 8, further comprising program instructions to tag the absent contact with a weak closeness factor.

10. The system of claim 9, wherein the classified photos are classified according to images.

11. The system of claim 10, further comprising program instructions to assign tags to the classified photos.

12. The system of claim 11, wherein the tags are name-related and subject-related.

13. The system of claim 12, further comprising program instructions to store a profile of the user, wherein:
the profile of the user includes a column containing a Field 1 storing a nickname identifier, a Field 2 storing a logo identifier, and a Field 3 storing a location, and
the profile of the user further includes an additional column storing closeness factors of the nickname identifier, the logo identifier, and the location identifier, and
the additional columns are adjacent to the column.

14. The system of claim 13, wherein in response to the user joining the group, further comprising program instructions to select particular identifiers for display on display devices of contact computers of the contacts in response to the closeness factor of each contact of the group.

15. The system of claim 14, wherein:
the photos are tagged with the closeness factors of each contact of the group by the image recognition and tagging device,
the closeness factors of each contact of the group include levels of closeness which include a strong level of closeness, a medium strong level of closeness, a medium level of closeness, and a weak level of closeness, and
the strong closeness factor identifies family members of the user, the medium strong closeness factor identifies friends and classmates of the user, the medium closeness factor identifies colleagues and customers of the user, and a weak closeness factor identifies strangers to the user.

16. The system of claim 15, wherein:
a photo of the photos for a family member of the user is tagged with the strong closeness factor; and
a photo of the photos for a stranger to the user is tagged with the weak closeness factor.

17. A computer program product for automatically switching an identifier of a user for display as the identifier of the user on a computing device of a contact, the computer program product comprising a computer readable storage medium having program instructions embodied therewith, the program instructions executable by a computer device to cause the computer device to:
associate a plurality of different types of identifiers of the user in a database, wherein each of the identifiers has a different closeness factor of the user;
store in the database the plurality of different types of identifiers of the user, wherein the plurality of different types of identifiers of the user include photos;
receive the photos from an external photo library by an image recognition and tagging device;
classify the photos according to topics using the image recognition and tagging device;
automatically select an identifier of the user without need for intervention by the user for display as the identifier of the user on the computing device of the contact in communication with the user over the network comprising:
  automatically determine a closeness factor of the contact to the user, the determined closeness factor of the contact having the same closeness factor with an identifier stored in the database comprised of the plurality of different types of identifiers of the user, the closeness factor indicative of a level of personal closeness of a relationship between the user and the contact, the level including a strong level of closeness, a medium strong level of closeness, a medium level of closeness, and a weak level of closeness; and
  automatically match the determined closeness factor of the contact with the identifier having the same closeness factor stored in a database comprised of the plurality of different types of identifiers of the user;
automatically transmit the matched identifier from the database to the computing device of the contact in communication over the network to display as the identifier of the user on the computing device, wherein the contact is one of a plurality of contacts forming a group which the user belongs to;
automatically switch the identifier of the user in communication over the network with the group comprising:
  automatically determine a group closeness factor which is based on a combination of closeness factors of each contact making up the group and other factors including a topic of the group, a group name, and a chat content of the group;
  automatically check the closeness factors of each contact of the group using a user's contact list and the closeness factors of each contact of the group; and
  automatically match the determined group closeness factor of the group with a different identifier having the same closeness factor stored in the database; and
automatically transmit the different identifier from the database to each computing device of each contact of the group in communication over the network for display as the different identifier of the user on the computing device of each contact of the chat group,
wherein at least two of the plurality of identifiers in the database have different closeness factors from one another.

18. The computer program product of claim 17, wherein:
the types of identifiers stored in the database include photos, logos, and signatures; and
each of the identifiers in the database has a corresponding closeness factor.

19. A system for automatically switching an identifier of a user for display as the identifier of the user on a computing device of a contact, comprising:
a processor, a computer readable memory, and a computer readable storage medium located in a computer;
program instructions associating a plurality of identifiers of the user in a database, wherein each of the identifiers has a different closeness factor of the user;
program instructions to store the plurality of identifiers of the user in the database, wherein each of the identifiers has the different closeness factor of the user than other identifiers of a same type stored in the database, wherein the plurality of identifiers include photos;
program instructions to receive the photos from an external photo library by an image recognition and tagging device;
program instructions to classify the photos according to topics using the image recognition and tagging device;
program instructions to receive by the user computer device a contact list of each member of a chat group joined by the user of the computer device;
program instructions to automatically select an identifier of the user without need for intervention by the user for display as the identifier of the user on a computing device of each of the members of the chat group in communication over a network comprising:
  program instructions to automatically determine a group closeness factor of the chat group to the user, the closeness factor determined by a combination of the closeness factor for each member of the chat group and other factors including a topic of the chat group, a chat group name, and a chat content of the chat group, the closeness factor indicative of a level of personal closeness of a relationship between the user and a member of the chat group, the level including a strong level of closeness, a medium strong level of closeness, a medium level of closeness, and a weak level of closeness; and
  program instructions to automatically match the determined group closeness factor of the chat group with the identifier having the same closeness factor stored in the database;
program instruction to store the matched identifier for the chat group in the database;
program instructions to automatically transmit the matched identifier from the database to the computing device of each of the members of the chat group in communication over the network for display as the identifier of the user on the computing device of each of the members of the chat group;
program instructions to automatically switch the identifier of the user in communication over the network with the chat group comprising:
  program instructions to receive by the user computer device an indication of a change of membership in the contact list of the chat group;
  program instructions to dynamically adjust the group closeness factors based on the change of membership in the contact list of the chat group by automatically redetermining the group closeness factor of the chat group to the user, the closeness factor determined by the combination of the closeness factor for each member of the chat group and other factors including the topic of the chat group, the chat group name, and the chat content of the chat group;
  program instructions to automatically match the redetermined group closeness factor of the chat group with another identifier having the same closeness factor stored in the database; and
  program instruction to automatically store the another identifier for the chat group in the database; and
program instructions to automatically transmit the another identifier from the database to the computing device of each of the members of the chat group in communication over a network for display as a replacement identifier of the user on the computing device of each of the members of the chat group.

20. The system of claim 19, further comprising:
program instructions to receive by the user computer device an indication of a change of the topic of the chat group; and
program instructions to dynamically adjust the group closeness factors based on the change of the topic of the chat group by automatically redetermining the group closeness factor of the chat group to the user, the closeness factor determined by the combination of the closeness factor for each member of the chat group and other factors including the topic of the chat group, the chat group name, and the chat content of the chat group.

* * * * *